United States Patent Office 3,773,945
Patented Nov. 20, 1973

3,773,945
PROCESS FOR CONTROLLING FUNGI
Asbjorn Baklien, Kingsbury, and Jocelyn Margaret Gregory, Croydon, Victoria, Australia, assignors to Imperial Chemical Industries of Australia and New Zealand Limited, Melbourne, Victoria, Australia
No Drawing. Filed Sept. 6, 1968, Ser. No. 758,132
Claims priority, application Australia, Sept. 11, 1967, 27,040/67
Int. Cl. A01n 9/12
U.S. Cl. 424—301        1 Claim

ABSTRACT OF THE DISCLOSURE

The growth of undesirable fungi is controlled by treating the same with thiol esters.

---

The present invention relates to new compositions of matter containing as an active ingredient esters and in particular it relates to new compositions of matter containing as an active ingredient thiol esters useful as fungicides, weedicides and acaricides.

It is known that certain chemicals may be applied to seeds, bulbs, corms, tubers and roots of plants to prevent their decay after planting and to control seed-borne and soil-borne plant diseases. Such chemicals act as fungicides and may be classified as disinfestants, disinfectants or protectants according to the location of the organisms to be combated. Disinfestants inactivate organisms, such as bunt spores, that are borne on the surface of the seed. Disinfactants are effective against organisms located deeper within the seed. Protectants protect the seed from attack by orgnaisms that are present in the soil. Fungicides include organic mercurial compounds for example ethyl mercuric chloride and ethyl mercuric p-toluenesulphonanilide, tetrachloro - p - benzoquinone, tetramethylthiuram disulphide and hexachlorobenzene. It has, however, been noted that the efficacy of certain fungicides, e.g. hexachlorobenzene against bunt and smut, has decreased over the years because strains of Tilletia spp emerged which were tolerant to hexachlorobenzene.

We have now found that bunt and smut and particularly strains of Tilletia spp may be controlled by the use of thiol esters applied to seds, bulbs, corms, tubers and roots of plants.

We have further found that the diseases wilt (Fusarium spp) and rot (Rhizoctonia spp) are controlled by certain compounds of this invention.

Accordingly, we provide new compositions of matter comprising firstly as the active ingredient at least one of the compounds of the formula

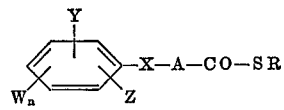

wherein X is selected from the group consisting of oxygen and sulphur W, Y and Z, which, separately, are selected from the group consisting of hydrogen, alkyl, aralkyl, alkoxy, halogen, nitro, cyano, amino, alkylamino, acylamino and dialkylamino, R is selected from the group consisting of alkyl, alkenyl, aralkyl, haloalkyl, alkoxyalkyl, dialkylaminoalkyl, haloaryl, alkoxycarbonylalkyl, hydroxyalkyl, aminoalkyl, alkylaminoalkyl and cycloalkyl, A may be a branched or straight chain alkylene group having from 1 to 3 carbon atoms wherein A is

and R'' is hydrogen, methyl or ethyl, and $n$ is an integer from 1 to 3 inclusive; and secondly an inert carrier. Examples of compounds which are effective as active constitutents of our compositions and which demonstrate suitable substituents W, Y, Z, X, A and R are listed in Table I.

In the column of Table I headed "W—Y—Z," H indicates that each of W, Y and Z are hydrogen. In cases where other radicals are listed, the residual W, Y or Z, if any, is hydrogen.

TABLE I

| No. | W-Y-Z | X | A | R |
|---|---|---|---|---|
| 1 | H | O | —CH₂— | Et |
| 2 | H | O | Same | Me |
| 3 | o-Me | O | do | Et |
| 4 | m-Me | O | do | t. Bu |
| 5 | p-Me | O | do | iso Pr |
| 6 | p-Et | O | do | Pr |
| 7 | p-t. Bu | O | do | Me |
| 8 | p-t. Bu | O | do | Et |
| 9 | p-t. Bu | O | do | ClCH₂CH₂ |
| 10 | p-t. Bu | O | do | CH₂=CHCH₂ |
| 11 | p-sec Bu | O | do | iso Bu |
| 12 | m-t. Bu | O | do | Bu |
| 13 | p-F | O | do | sec Bu |
| 14 | m-Cl | O | do | n-Hexyl |
| 15 | p-Cl | O | do | PhCH₂ |
| 16 | 2.3-Me₂ | O | do | ⌬ |
| 17 | 2.4-Me₂ | O | do | Et₂N.CH₂CH₂ |
| 18 | 2-iso Pr-4-Me | O | do | C₁₀H₂₁ |
| 19 | 4-NO₂ | O | do | Et |
| 20 | H | O | CH₃<br>  \|<br>—CH— | Me |
| 21 | 4-t. Bu | O | —CH₂—CH₂— | Et |
| 22 | H | O | CH₃<br>  \|<br>—CH— | C₁₂H₂₅ |
| 23 | H | O | Same | OH.CH₂CH₂ |
| 24 | p-Me | O | do | Et |
| 25 | p-iso Pr | O | do | Et |
| 26 | p-sec Bu | O | do | Et |
| 27 | p-t. Bu | O | do | Et |
| 28 | m-t. Bu | O | do | Et |
| 29 | p-PhCMe₂— | O | do | Et |

TABLE I—Continued

| No. | W-Y-Z | X | A | R |
|---|---|---|---|---|
| 30 | 3.4-Me | O | ...do... | Me |
| 31 | 3-Me-4-iso Pr | O | ...do... | Et |
| 32 | 2-Me-4-t. Bu | O | ...do... | Me |
| 33 | 2-Me-4-t.Bu | O | ...do... | Et |
| 34 | 2-Me-4-t. Bu | O | ...do... | Et₂NCH₂CH₂ |
| 35 | 2-Me-4-t. Bu | O | ...do... | PhCH₂CH₂ |
| 36 | 3.5-(t- Bu)₂ | O | ...do... | Et |
| 37 | 2.4-(sec Bu)₂ | O | ...do... | Et |
| 38 | o-MeO | O | ...do... | Me |
| 39 | m-MeO | O | ...do... | Et |
| 40 | pMeO | O | ...do... | iso Pr |
| 41 | p-EtO | O | ...do... | Et |
| 42 | p-BuO | O | ...do... | Me |
| 43 | 2-MeO-4-Et | O | ...do... | sec Bu |
| 44 | m-F | O | ...do... | 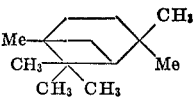 |
| 45 | o-Cl | O | ...do... | Et |
| 46 | p-Cl | O | ...do... | Et |
| 47 | 2.4-Cl₂ | O | ...do... | Et |
| 48 | 3.4-Cl₂ | O | ...do... | Et |
| 49 | 4-Br | O | ...do... | Et |
| 50 | 2.4.5-Cl₃ | O | ...do... | Et |
| 51 | 2-Me-4-Cl | O | ...do... | Et |
| 52 | 3.5-Me₂-4-Cl | O | ...do... | Me |
| 53 | o-NO₂ | O | ...do... | iso Bu |
| 54 | m-NO₂ | O | ...do... | Me |
| 55 | p-NO₂ | O | ...do... | Et |
| 56 | 2.4-NO₂-6-sec Bu | O | ...do... | Et |
| 57 | 2.4-NO₂-6-C₆H₁₁ | O | ...do... | Et |
| 58 | 2.4-NO₂-6-(2-octyl) | O | ...do... | Et |
| 59 | 3-CF₃ | O | ...do... | Et |
| 60 | 4-CN | O | ...do... | Et |
| 61 | 4-SMe | O | ...do... | Et |
| 62 | 4-SMe-3-Me | O | ...do... | Et |
| 63 | H | O | $-\overset{\text{Et}}{\underset{|}{\text{CH}}}-$ | Et |
| 64 | 4-AcNH | O | Same | EtOCH₂CH₂ |
| 65 | 3-NMe₂ | O | ...do... | Et |
| 66 | 3-NMe₂ | O | ...do... | CH₂COOEt |
| 67 | 4-NH₂ | O | ...do... | CH₂CH₂OH |
| 68 | 4-OH | O | ...do... | CH₂CH₂NH₂ |
| 69 | 2-Cl-4-NO₂ | O | ...do... | Et |
| 70 | 2.4-Cl₂-3, 5-Me₂ | O | ...do... | Et |
| 71 | p.t. Bu | O | $\text{CH}_3(\text{CH}_2)_{15}\overset{|}{\text{CH}}-$ | Et |
| 72 | p-t. Bu | O | $\text{CH}_3(\text{CH}_2)_9\overset{|}{\text{CH}}-$ | Et |
| 73 | p-t. Bu | O | $\text{ClCH}_2\cdot\overset{|}{\text{CH}}-$ | Et |
| 74 | p-t. Bu | O | $\text{MeOCH}_2\cdot\overset{|}{\text{CH}}-$ | Et |
| 75 | p-t. Bu | O | $\text{MeSCH}_2\overset{|}{\text{CH}}-$ | Et |
| 76 | H | S | —CH₂— | Me |
| 77 | H | S | Same | Et |
| 78 | H | S | ...do... | t. Bu |
| 79 | 4-Me | S | ...do... | Et |
| 80 | 4-Et | S | ...do... | Et |
| 81 | 4-iso Pr | S | ...do... | Et |
| 82 | 4-t. Bu | S | ...do... | Me |
| 83 | 4-t. Bu | S | ...do... | Et |
| 84 | H | S | $\text{CH}_3\cdot\overset{|}{\text{CH}}-$ | Me |
| 85 | H | S | Same | Et |
| 86 | 4-Cl | S | ...do... | Et |
| 87 | 4-NO₂ | S | ...do... | Et |
| 88 | 4-t. Bu | S | ...do... | Me |
| 89 | 4-t. Bu | S | ...do... | Et |
| 90 | 4-t. Bu | S | ...do... | ClCH₂CH₂ |
| 91 | 4-t. Bu-2-Me | S | ...do... | Et |
| 92 | 4-t. Bu | S | ...do... | iso Pr |
| 93 | 4-t. Bu | S | ...do... | sec Bu |
| 94 | 2.4-Cl₂ | S | ...do... | Et |
| 95 | 2-Me-4-Cl | S | ...do... | Et |
| 96 | 4-t. Bu | S | $\text{Et}\cdot\overset{|}{\text{CH}}-$ | Et |
| 97 | 4-t. Bu | S | $\text{CH}_3(\text{CH}_2)_9\overset{|}{\text{CH}}-$ | Et |
| 98 | 4-F | O | $\text{CH}_2\cdot\overset{|}{\text{CH}}-$ | Et |
| 99 | m-Me | O | —CH₂— | Me |
| 100 | m-Me | O | Same | Et |
| 101 | p-F | O | ...do... | Me |
| 102 | p-F | O | ...do... | Et-OOC—CH₂— |
| 103 | p-Cl | O | ...do... | Et |
| 104 | 2,4-Cl₂ | O | ...do... | Et |
| 105 | H | O | $\text{H}_3\text{C}-\overset{|}{\text{CH}}-$ | Et |

TABLE I—Continued

| No. | W-Y-Z | X | A | R |
|---|---|---|---|---|
| 106 | H | O | Same | t. Bu |
| 107 | H | O | ...do... | t. Bu—⟨C₆H₄⟩—CH |
| 108 | H | O | ...do... | —⟨C₆Cl₅⟩ (Cl,Cl,Cl,Cl,Cl) |
| 109 | H | O | —CH₂— | n-Hexyl |
| 110 | H | O | Same | t. Bu—⟨C₆H₄⟩— |
| 111 | H | O | ...do... | ⟨cyclohexyl with CH₃, CH₃, CH₃⟩ |
| 112 | p-t. Bu | O | H₃C—CH— | Me |
| 113 | p-t. Bu | O | Same | sec. Bu |
| 114 | p-t. Bu | O | ...do... | t-Bu |
| 115 | p-t. Bu | O | ...do... | n-Hexyl |
| 116 | p-t. Bu | O | ...do... | —⟨C₆H₄⟩—Cl |
| 117 | H | O | H₅C₂—CH— | Me |
| 118 | H | S | —CH₂— | n-Hexyl |
| 119 | H | O | H₅C₂—CH— | t-Bu |
| 120 | H | O | Same | Cl—CH₂—CH₂—CH₂— |
| 121 | p-t. Bu | S | H₃C—CH— | —⟨C₆H₄⟩—Cl |
| 122 | 3,5-Me₂ | O | —CH₂— | Et |
| 123 | 3,5-Me₂ | O | Same | C₁₀H₂₁ |
| 124 | 3,5-Me₂ | O | ...do... | —⟨C₆H₄⟩—Cl |
| 125 | 4-PhO | O | ...do... | Et |
| 126 | 3,5-Me | O | ...do... | Me |

By inert carrier we mean either a liquid or a solid diluent used to obtain the desired concentration and to facilitate handling. For some purposes liquid formulations are convenient and among these again aqueous liquid formulations are preferred. The latter may conveniently be prepared from emulsifiable solutions of the active compounds in organic solvents by dissolving the active ingredients in a solvent which is non-phytocidal to the seed which is to be treated e.g. in acetone, xylene, toluene, kerosene or the methylated naphthalenes, adding an emulsifier and/or wetting agent and emulsifying the solution in water. A typical emulsifiable concentrate of this type would comprise 10% of ethyl 2-(p-tertiary butylphenoxy)thiolpropionate, 80% acetone, 5% xylene and 5% of an alkyl aryl polyether alcohol emulsifier, all quantities being expressed on a weight basis. Alternatively our mixtures may also be formulated into slurries by dissolving the active ingredients in non-phytocidal solvents and adding the solution so formed to aqueous slurries of solid inert carriers such as powdered chalk, talcs, china clays, kieselguhr, bentonite and other colloidal clays.

Our mixtures may also be formulated into dusts by combining them with solid inert carriers as above disclosed. They may also be formulated as dispersible powders by milling the active ingredient to a fine powder, optionally, together with an inert solid carrier as above disclosed and adding a dispersing agent. The preferred dispersible powders comprise the active ingredient, finely ground with a colloidal clay together with a dispersing agent. Suitable emulsifying and dispersing agents are known from the prior art; anionic, cationic and nonionic agents may be used. A suitable onionic emulsifier is for example the condensation product of nonylphenol with ethylene oxide available commercially under the Trademark "Lissapol" N; suitable dispersing agents are for example the disodium salt of dinaphthylmethane disulphonic acid, sodium lauryl sulphonate and the condensation product of alkylphenol with ethylene oxide available commercially under the Trademark "Lubrol" E.

The active ingredients, typically represented by the compounds of Table I are new substances. Accordingly we also provide compounds of the formula:

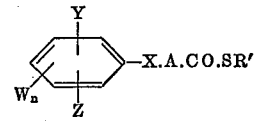

wherein W, Y and Z, separately, may be hydrogen, alkyl, aralkyl, alkoxy, halogen, nitro, cyano, amino, alkylamino, acylamino and dialkylamino; A may be a straight or branched alkylene group having 1 to 3 carbon atoms, wherein A is

and R'' is hydrogen, methyl or ethyl; $n$ is an integer from 1 to 3 inclusive; X is O or S; and R' is alkyl, alkenyl, aralkyl, haloaryl, haloalkyl, alkoxyalkyl, dialkylaminoalkyl, alkoxycarbonylalkyl, hydroxyalkyl, aminoalkyl, alkylaminoalkyl or cycloalkyl, except, however, that whenever A stands for

and W, Z, Y are all hydrogen, R' cannot be ethyl.

Preferred compounds are those given by the formula

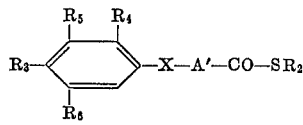

wherein X is O or S; A' is

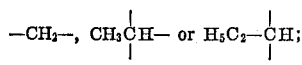

$R_3$ is hydrogen, chlorine, fluorine or tertiary butyl; $R_4$ is hydrogen or chlorine; $R_5$ is hydrogen or methyl; $R_6$ is hydrogen or chlorine; $R_2$ is alkyl containing from 1 to 6 inclusive carbon atoms in the chain

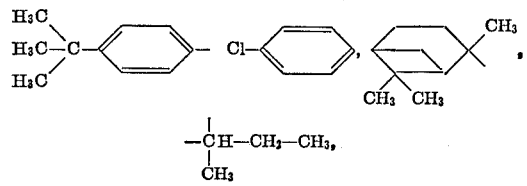

—$CH_2$—$CH_2$—OH or —$CH_2$—COO—$C_2H_5$; except however that whenever A' stands for

and $R_3$, $R_4$, $R_5$ and $R_6$ are all hydrogen, $R_2$ cannot be ethyl.

The active ingredients of our compositions may be prepared by the methods represented by the Equations I (step 1) and IIa and IIb (variants of step 2):

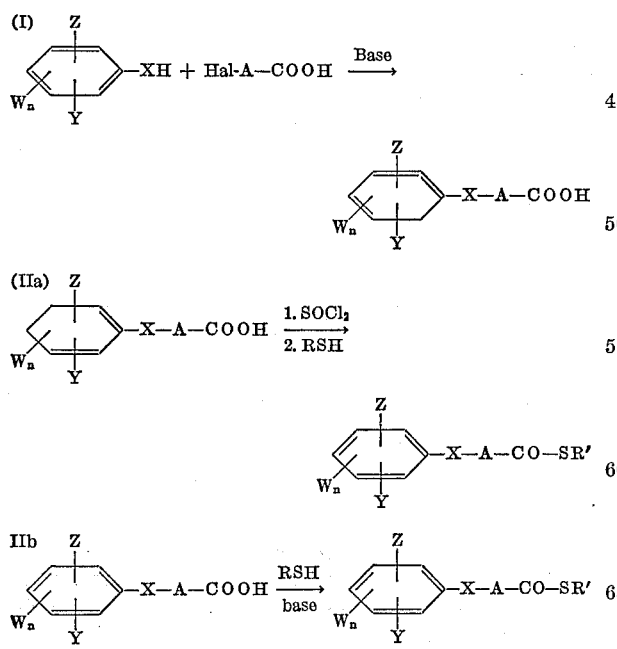

wherein A, R', W, X, Y, Z and n are as above defined and Hal is halogen, preferably chlorine or bromine.

In reaction (I) the reactants are reacted in a solvent such as water, alcohol, benzene, ether, dimethylformamide, dioxan, acetone, and toluene in the presence of a base such as the hydroxides, carbonates and ethoxides of the alkali metals, triethylamine or pylridine at temperatures ranging from 0° C. to the reflux temperature of the solvent.

The reaction according to Equation IIa may be carried out in the presence of excess $SOCl_2$ optionally in the presence of an inert solvent.

The reaction according to Equation IIb may be carried out in the presence of an inert solvent such as ethylene dichloride, methylene chloride, ether or benzene in the presence of a base such as triethylamine or pyridine.

The compositions of our invention have useful pesticidal, particularly fungicidal properties. Thus we have discovered that these compositions have a high fungicidal activity when applied to media containing fungi, for example *Tilletia foetida*, *Ustilago hordei*, *Fusarium oxysporum* or *Rhizoctonia solani*. When for example a medium sprayed with spores of *Tilletia foetida* or *Ustilago hordei* is incubated and then treated with compositions according to our invention, concentrations of active ingredient as low as 0.4 part per million based on the weight of the medium were effective in controlling spore development.

Accordingly we provide a process of controlling the growth of undesired fungi which comprises treating said undesired fungi with a composition according to this invention.

We have also discovered that when seeds, bulbs, corms, tubers or roots of plants which are infected or infested with fungi, whether now the infestation or infection occurred prior to or subsequent to planting, are treated prior to planting with compositions acording to our invention, the growth of said fungi is controlled. Compositions containing as little as 70 parts of active ingredient per million parts of seed are useful in controlling fungi, e.g. *Tilletia foetida* on wheat seeds; 200 parts of active ingredient per million parts of seed are preferred and 250 parts of active ingredient per million parts of seed are most preferred.

Accordingly we also provide a process of treating seeds, bulbs, corms, tubers or roots of plants with a composition according to our invention.

Under suitable climatic conditions our compositions may also be used to treat soil to inhibit fungal activity in the soil prior to planting seeds and the like therein.

In contrast to the conventional fungicides based on mercury the compositions according to our invention have a low level of toxicity. Many of the compounds used as active ingredients in our compositions are non-toxic to mice at concentrations in excess of 1000 mg./kg.

Certain compounds of our invention have other useful biological properties. Thus we have discovered that certain of our compounds kill the adult and ova stages of *Tetranychus telarius* (red spider) for example on beans and apple and pear trees. and the larval stages of *Boophilus microplus* (cattle tick). Accordingly we also provide a process of eradicating undesired acarina which comprises treating media including plants and animals infested with acarina with compositions of matter according to this invention.

We have also discovered that certain of our compounds are effective as selective weedicides both at the pre-emergence and post-emergence stages. Thus the application of certain of our compounds in amounts ranging up to 4 lb./acre results in the control of undesired plant life for example broad leaf dicotyledonus weeds such as ipomoea, mustard and spiny emex and also thorny shrubs such as lantana. Our compounds are particularly useful in controlling weed growth in cereal crops. Accordingly we also provide a process of selectively eradicating undesired dicotyledonus plants and thorny shrubs which comprises treating said plants and shrubs with compositions according to our invention.

The following examples illustrate the preparation of the compounds and compositions of our invention and their biological effects, but are not to be construed as limiting. All concentrations are on a weight basis unless otherwise specified.

EXAMPLE 1

4 g. ethyl 2-(p-tertiary butylphenoxy)thiolpropionate were dissolved in 91 g. acetone, 5 g. of "Lissapol" N were added, and the whole was mixed. There was thus obtained a composition containing 4% w./w. of ethyl 2-(p-tertiary butylphenoxy)thiolpropionate, which was suitable for dilution with water to give a dispersion of the active ingredient.

EXAMPLE 2

4 g. ethyl 2-(p-tertiary butylphenoxy)thiolpropionate dissolved in 6 g. acetone was added to 12 g. finely divided china clay. The acetone was evaporated from the mixture and the resultant product was ground to a fine powder. There was thus obtained a composition in the form of a fine powder or dust containing 25% w./w. of ethyl 2-(p-tertiary butylphenoxy)thiolpropionate as active ingredient suitable for dilution by the addition of inert carriers.

EXAMPLE 3

12 g. finely divided china clay was dispersed in 24 g. water to form a slurry. To the slurry so prepared was added a solution of 4 g. ethyl 2-(p-tertiary butylphenoxy)thiolpropionate dissolved in 6 g. acetone. The acetone was evaporated from the mixture so prepared, and sufficient water was then added to bring the total weight of the composition to 40 g. On further mixing there was thus obtained a composition in the form of a slurry containing 10% w./w. of ethyl 2-(p-tertiary butylphenoxy)thiolpropionate as active ingredient suitable for dilution by the addition of water.

EXAMPLE 4

The composition obtained in Example 1 was diluted with appropriate amounts of water so that when 0.5 ml. of the diluted suspension of ethyl 2-(p-tertiary butylphenoxy)thiolpropionate was mixed in 1 oz. jars with 20 ml. of 1% w./w. agar in water, the concentration of active ingredient was 25, 10, 2 and 0.4 p.p.m. with respect to the total weight of the agar-water mixture. A suspension containing a high concentration of spores was sprayed over the surface of the cooled agar and the inoculated mass was then incubated for four days. After this period of time the mass was inspected and the degree of inhibition of spores was assessed using as a comparison a system similarly prepared but in which there was no active ingredient. The results are set out in Table II.

TABLE II

Active ingredient.—Ethyl 2-(p-tertiarybutylphenoxy) thiolpropionate

| Fungi | Degree of inhibition, percent | |
| --- | --- | --- |
| | (Hexachlorobenzene-resistant) Tilletia foetida | Ustilago hordei |
| Concentration of active ingredient, p.p.m.: | | |
| 25 | 75-100 | 75-100 |
| 10 | 75-100 | 75-100 |
| 2 | 75-100 | 75-100 |
| 0.4 | NIL | NIL |
| 0.0 | NIL | NIL |

This example demonstrates that fungi may be inhibited in vitro when treated with ethyl 2-(p-tertiary butylphenoxy)thiolpropionate.

EXAMPLE 5

A bunt susceptible strain of wheat was inoculated with Tilletia foetida by adding to the wheat seed 0.5% of its weight of spores of Tilletia foetida and ball-milling the mixture of wheat and spores sufficiently to ensure an even distribution of spores. Compositions from Example 2 were then prepared, undiluted and diluted with varying amounts of china clay to give 25% (undiluted), 12½%, 6¼% and 3⅛% w./w. of active ingredient; these were added to the inoculated wheat seed at the rate of 2 oz. per bushel of seed. The concentrations of active ingredient so obtained were, 500, 250, 125 and 62 parts per million parts of seed. For comparison the inoculated seed was also treated with a known fungicide, hexachlorobenzene, at the rate of 500 parts per million parts of seed. Twenty wheat seeds per treatment were sown in John Innes compost contained in 2 oz. paper cups and allowed to germinate in an incubator until they had reached a suitable height for transplanting to 5" pots containing soil typical of that in wheat-growing areas in Australia. The plants were grown to maturity in a glass house and the percentage of diseased heads obtained from seeds of each treatment was assessed. The results are set out in Table III.

TABLE III

Effect of applying fungicides in dust form to wheat seed inoculated with Tilletia foetida (hexachlorobenzene-resistant)

| Active ingredient | Concentration of active ingredient, p.p.m. | Percent disease in wheat |
| --- | --- | --- |
| Ethyl 2-(p-tertiary butylphenoxy) thiolpropionate. | 500 | 0 |
| | 250 | 0 |
| | 125 | 7 |
| | 62 | 30 |
| Hexachlorobenzene | 500 | 45 |

EXAMPLE 6

A bunt-susceptible strain of wheat was inoculated with hexachlorobenzene-resistant Tilletia foetida by adding to the wheat seed 0.5% of its weight of spores of said Tilletia foetida and ball-milling the mixture sufficiently to ensure an even distribution of spores. The composition from Example 3 was added to the inoculated wheat seed at the rate of 2.5 fluid oz. per bushel of seed. The mixture was ball-milled until a uniform product was obtained, containing 250 parts of active ingredient per million parts of seed. Similarly composition from Example 3 were also diluted with water to give compositions containing 5% w./w. and 2.5% w./w. which, when added to the inoculated wheat seed at the rate of 2.5 fluid oz. per bushel of wheat seed, gave concentrations of 125 and 62 parts of active ingredient per million parts of seed. Twenty wheat seeds per treatment were sown in John Innes' compost contained in 2 oz. paper cups and allowed to germinate in an incubator until they had reached a suitable height for transplanting to 5" pots containing soil typical of that in wheat-growing areas in Australia. The plants were grown to maturity in a glass house and the percentage of diseased heads obtained from seeds of each treatment was assessed. Results are set out in Table IV.

TABLE IV

Effect of applying a fungicide in slurry form to wheat seed incoultaed with Tilletia foetida (hexachlorobenzene-resistant)

| Active ingredient | Concentration of active ingredient, p.p.m. | Percent disease in wheat |
| --- | --- | --- |
| Ethyl 2-(p-tertiary bytylphenoxy) thiolpropionate. | 250 | 0 |
| | 125 | 5 |
| | 62 | 26 |

EXAMPLE 7

Example 5 was repeated except that the wheat seed was inoculated with Ustilago hordei instead of Tilletia foetida. The results obtained were similar to those obtained in Example 5.

EXAMPLE 8

Example 6 was repeated except that the wheat seed was inoculated with Ustilago hordei instead of Tilletia foetida. The results obtained were similar to those obtained in Example 6.

EXAMPLE 9

The compound ethyl 2-(p-tertiary butylphenylthio)-thiolpropionate was formulated by the method of Example 1 and the formulation tested by the method described in Example 4. The results are shown in Table V.

TABLE V

| Active ingredient | Percent inhibition of growth of Tilletia foetida | | | |
|---|---|---|---|---|
| | 10 p.p.m. | 2 p.p.m. | 0.4 p.p.m. | 0.08 p.p.m. |
| Ethyl 2-(p-tertiary butylphenylthio) thiolpropionate | 100 | 100 | 100 | 45 |

EXAMPLE 10

Ethyl 2-(p-tertiary butylphenoxy)thiolpropionate was formulated by the method of Example 1. The composition obtained was diluted with appropriate amounts of water so that when 0.5 ml. of the diluted suspension of ethyl 2 - (p - tertiary butylphenoxy)thiolpropionate was mixed in 1 oz. jars with 20 ml. of 1% w./w. agar in water, the concentration of active ingredient was 25, 10, 2 and 0.4 p.p.m. with respect to the total weight of the agar-water mixture. The contents of the jars were then poured into Petri dishes. A plug of agar (approximately 1/16 square inch) bearing mycelia growth of *Fusarium oxysporum* (Experimental series A) and *Rhizoctonia solani* (Experimental series B) was placed on the cool and set agar of two experimental series, respectively, and incubated for five days when the degree of inhibition of mycelial growth was assessed. Results are shown in Table VI.

EXAMPLE 11

Eheyl 2 - (p - tertiary butylphenylthio)thiolpropionate was formulated and tested by the method described in Example 10. Results are shown in Table VI.

TABLE VI

| | Percent inhibition of growth of fungus— | | | | | | | |
|---|---|---|---|---|---|---|---|---|
| | Fusarium oxysporum | | | | Rhizoctonia solani | | | |
| | 10 | 2 | 0.4 | 0.08 | 10 | 2 | 0.4 | 0.08 |
| Active ingredient: | | | | | | | | |
| Ethyl 2-(p-tertiary butylphenoxy) thiolpropionate (Ex. 10) | 100 | 100 | 80 | 50–75 | 100 | 75–100 | 50–75 | 50–75 |
| Ethyl 2-(p-tertiary butylphenylthio) thiolpropionate (Ex. 11) | 100 | 80 | 40 | 0 | 100 | 45 | 0 | 0 |

EXAMPLE 12

$$\text{t.Bu}-\underset{}{\underset{}{\bigcirc}}-\text{O.}\overset{\text{CH}_3}{\underset{|}{\text{C}}}\text{H.CO.SEt}$$

Ethyl 2-(p-tertiary butylphenoxy)thiolpropionate (A) A mixture of p-tertiary butylphenol (75 g., 0.5 mol), 2-bromopropionic acid (77 g., 0.5 mole), NaOH (40 g., 1 mole) and water (250 ml.) was heated on the steam-bath for 24 hours. The reaction mixture was acidified and extracted with $CHCl_3$ (2×200 ml.). The $CHCl_3$ extract was treated with excess aqueous $NaHCO_3$—solution with vigorous stirring. The aqueous phase was separated, acidified with HCl and the product extracted with $CHCl_3$. The $CHCl_3$ extract was dried and evaporated to dryness to leave the product as a light-coloured oil which soon solidified.

(B) 2 - (p - tertiary butylphenoxy)propionic acid (80.8 g., 0.4 mol) and thionyl chloride (49 g.) were refluxed for several hours, then the solution was placed under vacuum to remove dissolved HCl and $SO_2$.

(C) The benzene solution of the acid chloride prepared in Section B of this example was added drop-wise with stirring and cooling to a solution of ethanethiol (25 g., 0.4 mole) and triethylamine (45 g.) in benzene (200 ml.). The mixture was filtered, the benzene distilled off and the product distilled in vacuo to yield the compound as a light-coloured, viscous oil. B.P. 100–101° C./0.001 mm. Hg. By the method of Example 12 there were prepared:

ethyl 2-(p-isopropylphenoxy)thiolpropionate, colourless oil
ethyl 2-(p-sec.butylphenoxy)thiolpropionate, colourless oil
ethyl 2-(p-cresoxy)thiolpropionate, colourless oil
methyl 2-(2-methyl-4-tertiary butylphenoxy)thiolpropionate, colourless oil
allyl p-tertiary butylphenoxy thiolacetate, colourless oil
ethyl 2-(m-dimethylaminophenoxy)thiolbutyrate, light yellow oil
ethyl 2-(p-tertiary butylphenoxy)thiolstearate, light yellow oil

EXAMPLE 13

$$\text{F}-\underset{}{\underset{}{\bigcirc}}-\text{O.}\overset{\text{CH}_3}{\underset{|}{\text{C}}}\text{H.COSEt}$$

Ethyl 2-(p-fluorophenoxy)thiolpropionate 2-(p-fluorophenoxy)propionic acid (18.4 g.) was dissolved in diethyl ether (100 ml.). Thionyl chloride (13 g.) was added dropwise with stirring. The solvent and unreacted thionyl chloride were removed by distillation under reduced pressure to leave the acid chloride as a light-yellow oil. The oil was dissolved in chloroform (100 ml.) and added dropwise and with stirring to a solution of ethanethiol (6.5 g.) and pyridine (8.8 g.) in chloroform (100 ml.). After stirring for 1 hour at room temperature the mixture was filtered, solvents distilled off and the residual oil distilled in vacuo to yield a light straw-coloured oil, B.P. 132–37°/0.01 mm. Hg.

In the same manner there were prepared:

isopropyl 2-(p-methoxyphenoxy)thiolpropionate
benzyl p-chlorophenoxythiolacetate
ethyl 2-(3,4-dichlorophenoxy)thiolpropionate
2-chloroethyl p-tertiary butylphenoxythiolacetate
2-hydroxyethyl 2-(p-aminophenoxy)thiolbutyrate
2-aminoethyl 2-(p-hydroxyphenoxy)thiolbutyrate
ethyl 2-(p-tertiary butylphenoxy)thiollaurate
ethyl 3-chloro-2-(p-tertiary butylphenoxy)thiolpropionate
2-diethylaminoethyl 2-(2-methyl-4-tertiary butylphenoxy) thiolpropionate
ethyl 2-(p-ethoxyphenoxy)thiolpropionate

EXAMPLE 14

$$\text{NO}_2-\underset{}{\underset{}{\bigcirc}}-\text{O.}\overset{\text{CH}_3}{\underset{|}{\text{C}}}\text{HC.O.SEt}$$

Ethyl 2-(p-nitrophenoxy)thiolpropionate 2-(p-nitrophenoxy)propionic acid (21.1 g.) was dissolved in 200 ml. of benzene and thionyl chloride (13 g.) added dropwise with stirring. Stirring was continued for 1 hour and the solvents were then removed under reduced pressure to leave the chloride as a semisolid yellowish-brown mass. The crude chloride was dissolved in diethyl ether (150 ml.) and the solution added dropwise and with stirring to a solution of ethanethiol (6.5 g.) and triethylamine (12 g.) in ether (100 ml.). The mixture was warmed at 30° C. for 40 minutes, filtered and the solvents removed by distillation. The residue was recrystallized from petroleum ether 60–80°/diethylether. Yellow crystals of M.P. 42–4° C.

By the same method were prepared:

ethyl 2-(2-chloro-4-nitrophenoxy)thiolbutyrate
ethyl 2-(2,4,5-trichlorophenoxy)thiolpropionate
methyl 2-(m-nitrophenoxy)thiolpropionate
ethyl 2-(2,4-dinitro-6-sec.butylphenoxy)thiolpropionate ethyl 2-(2,4-dinitro-6-cyclohexylphenoxy)thiolpropionate
ethyl 2-(2,4-dinitro-6-(2-octyl)phenoxy)thiolpropionate
2-ethoxyethyl 2-(p-acetamidophenoxy)thiolbutyrate shown in Table VII demonstrate that fungi may be inhibited in vitro when treated with compounds set out in Table VII.

TABLE VII

| | Fungus | | | | | |
|---|---|---|---|---|---|---|
| | Hexachlorobenzene-resistant *Tilletia foetida*—Degree (percent) of inhibition at— | | | *Ustilago hordei*—Degree (percent) of inhibition at— | | |
| Concentration of active ingredient | 10 p.p.m. | 2 p.p.m. | 0.4 p.p.m. | 10 p.p.m. | 2 p.p.m. | 0.4 p.p.m. |
| Active ingredient—Compound number of Table I: | | | | | | |
| 1 | 75–100 | 75–100 | 75–100 | 75–100 | 75–100 | 24–59 |
| 8 | 75–100 | 75–100 | 75–100 | 75–100 | Nil | |
| 23 | 75–100 | 75–100 | Nil | Nil | | |
| 63 | 75–100 | 75–100 | 50–74 | Nil | | |
| 77 | 75–100 | 75–100 | 75–100 | Nil | | |
| 89 | 75–100 | 75–100 | 75–100 | Nil | | |
| 100 | 75–100 | 75–100 | 75–100 | 75–100 | 75–100 | 75–100 |
| 102 | 75–100 | 75–100 | 75–100 | Nil | | |
| 103 | 75–100 | 75–100 | 75–100 | 75–100 | 75–100 | 75–100 |
| 104 | 75–100 | 75–100 | 75–100 | 75–100 | 75–100 | 50–74 |
| 105 | 75–100 | 75–100 | 50–74 | 75–100 | Nil | | ethyl 2-(p-chlorophenoxy)thiolpropionate
ethyl 2-(p-bromophenoxy)thiolpropionate
methyl 2-(3,5-dimethyl-4-chlorophenoxy)thiolpropionate
ethyl 2-(3,5-dimethyl-2,4-dichlorophenoxy)thiolbutyrate
ethyl 3-(p-tertiary butylphenoxy)thiolbutyrate

EXAMPLE 15

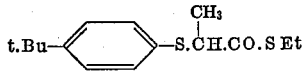

Ethyl 2-(p-tertiary butylphenylthio)thiolpropionate (A) p-tertiary butylthiophenol (166 g.) and sodium hydroxide (80 g.) were dissolved in 1500 ml. of water. The solution was heated to 40 C. and with slow stirring a solution of 2-chloropropionic acid (109 g.) in 50% ethanol (200 ml.) was dropped in over 30 minutes. The mixture was then heated at 60° C. for a further 2 hours, cooled to room temperature, and acidified with hydrochloric acid. The solids obtained were filtered off, washed with water and dried.

(B) 2-(p-tertiary butylphenylthio)propionic acid (23.8 g.) was dissolved in anhydrous diethyl ether (200 ml.) and a solution of thionyl chloride (13 g.) in ether (50 ml.) added dropwise and with stirring. Stirring was continued for 1 hour at room temperature then the mixture was filtered and the filtrate evaporated to dryness to leave the crude acid chloride as an oil.

(C) The oil from (B) was dissolved in ethylene dichloride (100 ml.) and the solution added dropwise and with stirring to a solution of ethanethiol (6.5 g.) and triethylamine (12 g.) in ethyelne dichloride (100 ml.) The precipitated salt was filtered off, the solvent distilled under reduced pressure and the residual oil distilled in vacuo to give 21.4 g. of a yellow oil, B.P. 148–51° C./0.01 mm. Hg.

In the same manner were prepared:

ethyl 2-(p-chlorophenylthio)thiolpropionate
2-chloroethyl 2-(p-tertiary butylphenylthio)thiolpropionate
ethyl 2-(2-methyl-4-chlorophenylthio)thiolpropionate
ethyl 2-(p-tertiary butylphenylthio)thiolbutyrate
ethyl 2-(p-tertiary butylphenyl)thiollaurate and
t.butyl phenylthio thiolacetate.

EXAMPLE 16

Compositions were prepared as set out in Example 1, but the ethyl 2-(p-tertiary butylphenoxy)thiolpropionate of that example was replaced by the compounds set out in Table VII.

EXAMPLE 17

Example 4 was repeated but the composition of that example containing ethyl 2-(p-tertiary butylphenoxy)thiolpropionate was replaced by the compositions of Example 16, at concentrations of active ingredient of 10, 2 and 0.4 p.p.m. The degrees of inhibition obtained and shown in Table VII demonstrate that fungi may be inhibited in vitro when treated with compounds set out in Table VII.

EXAMPLE 18

Formulations of the compounds of the invention were prepared to give a 4% w./v. concentration of active ingredient and these were diluted with tap water to give concentrations of the active ingredient suitable for demonstrating biological activity. The concentrated formulations were prepared as described below.

Those compounds of the invention which are solids at room temperature were ball milled as 4% w./v. suspension in a 0.25% w./v. aqueous solution of "Lubrol" E (Registered Trademark). "Lubrol" E is a condensation product of alkyl phenol with the ethylene oxide.

Those compounds of the invention which are liquids at rooms temperature were dissolved, by warming if necessary, in a mixture of equal volumes of "Lubrol" E and "Lubrol" MOA (Registered Trademark). "Lubrol" MOA is a long chain fatty alcohol/ethylene oxide condensate with a relatively short polyethylene glycol chain. The solution of the compound in the mixture of "Lubrol" E and "Lubrol" MOA was then emulsified in water to give a concentration of 4% w./v. of compound and a concentration of the combined weights of "Lubrol" E and "Lubrol" MOA of 0.25% w./v.

French bean plants with leaves cut to 1" square were infested with approximately 30 adult mites of *Tetranychus telarius* each. 24 hours after infestation, the leaves of two plants per treatment were sprayed with one or more of the following concentrations of the active compound: 0.025%, 0.05% and 0.1% w./v. 4 days after spraying the live and dead adult mites were counted. The control of adult mites obtained by these tests is given in Table VIII as percentage mortality.

EXAMPE 19

Example 18 was repeated, but the leaves were infested with mobile stages and ova *Tetranychus telarius* and before spraying the mobile stages were removed from the leaves by means of a stream of compressed air. The count of live and dead young and dead eggs was made 7 days after spraying. The control of ova obtained by these tests is given in Table VIII as percentage mortality.

TABLE VIII

| | Percentage mortality obtained on *Tetranychus telarius* | | | | | |
|---|---|---|---|---|---|---|
| | Adults | | | Ova | | |
| Concentration of active ingredients, percent w./v. | 0.1 | 0.05 | 0.025 | 0.1 | 0.05 | 0.025 |
| Active ingredient—Compound No. of Table I: | | | | | | |
| 1 | 100 | 70 | 15 | 100 | 50 | 15 |
| 100 | 70 | 25 | 5 | 0 | | |
| 102 | 70 | 30 | 10 | 65 | 40 | 10 |
| 103 | 100 | 65 | 25 | 70 | 40 | 15 |

EXAMPLE 20

The biological effect on larval cattle ticks of our compositions was tested as follows.

Aqueous dispersions of the active ingredients containing 0.01, 0.1 and 1.0% w./v. of the compounds listed in Table IX were prepared by the method of Example 18. Approximately 100 larval ticks were immersed briefly in the dispersions and a mortality count on the ticks was done after 48 hours. The control attained is given in Table IX as percentage mortality.

TABLE IX

Percentage mortality obtained on larval cattle ticks

| Concentration of active ingredient, percent w./v. | 0.01 | 0.1 | 1.0 |
|---|---|---|---|
| Active ingredient—Compound No. of Table I: | | | |
| 1 | 0 | 100 | 100 |
| 27 | 0 | 0 | 100 |
| 89 | | 0 | 100 |
| 116 | | 0 | 100 |

EXAMPLE 21

2% w./v. aqueous dispersions of the compounds set out in Table X were prepared by the method described in Example 18. The dispersions were diluted as required with water and sprayed by hand through an "Aerograph" spray gun on to test plants at the rates set out below for assessment of post-emergence herbicidal activity. The test plants were growing in boxes 14½ x 4" x 3"; each box contained 1 row each of the plants under test and the plants were one week old at the time of the spraying of the active ingredient. Furthermore the compounds were also tested for pre-emergence activity by spraying in the same manner as for the post-emergence treatment on it soil in similar boxes in which seeds had been sown the day before spraying. Three weeks after applying the post-emergence and pre-emergence spray treatments, the plants in the treated boxes were compared with those in untreated boxes, and assessed for response to the treatment using an arbitrary phytotoxicity scale of from O (no damage) to 5 (death). The results obtained are set out in Table X. Applications of the active ingredient were made at the rate of 1 lb. per acre except in the cases where spiny emex and lantana were treated and for these tests application rates were 2 lb./acre and 4 lb./acre respectively.

TABLE X.—PHYTOTOXICITY RATINGS

| Active ingredient—Compound No. of Table I | Pre-emergence | | | | | | | |
|---|---|---|---|---|---|---|---|---|
| | 1 | 2 | 13 | 104 | 105 | 109 | 110 | 111 |
| Plant: | | | | | | | | |
| Wheat | — | 0 | — | — | 0 | 0 | — | 0 |
| Ryegrass | 1 | 0 | 0 | 0 | 0 | 0 | 0 | 0 |
| Barley | — | 0 | — | — | 0 | 0 | — | 0 |
| Oats | 1 | 0 | 0 | 0 | 0 | 0 | 0 | 0 |
| Wild oats | 1 | 0 | 0 | 0 | 0 | 0 | 0 | 0 |
| Japanese millet | 1 | 0 | 0 | 0 | 0 | 1 | 0 | 0 |
| Peas | 5 | 5 | 0 | 0 | 5 | 5 | 0 | 5 |
| Cotton | — | 2 | — | — | 2 | 1 | — | 0 |
| Ipomea | 5 | 5 | 0 | 0 | 5 | 5 | 0 | 5 |
| Mstard | 5 | 5 | 0 | 0 | 5 | 5 | 0 | 5 |
| | Post-emergence | | | | | | | |
| Wheat | — | 0 | — | — | 0 | 0 | — | 0 |
| Ryegrass | 0 | 0 | 0 | 0 | 0 | 0 | 1 | 0 |
| Barley | — | 0 | — | — | 0 | 0 | — | 0 |
| Oats | 0 | 0 | 0 | 0 | 0 | 0 | 1 | 0 |
| Wild oats | 0 | 0 | 0 | 0 | 0 | 0 | 1 | 0 |
| Japanese millet | 1 | 0 | 0 | 1 | 0 | 2 | 1 | 0 |
| Peas | 5 | 5 | 5 | 5 | 0 | 5 | 5 | 5 |
| Cotton | — | 5 | — | — | 0 | 5 | — | 5 |
| Ipomoea | 5 | 5 | 5 | 5 | 0 | 5 | 5 | 5 |
| Mustard | 5 | 5 | 5 | 5 | 0 | 5 | 5 | 5 |
| Spiny emex | — | 4 | — | — | 0 | 5 | — | 5 |
| Lantana | 0 | 5 | 5 | 4 | 0 | 5 | 5 | 0 |

Note.—"—" indicates no test was performed.

The results shown in Table X show that the compounds exhibit high herbicidal activity at spray rates as low as 1 lb./acre. Moreover they exhibit high selectivity, being generally less active on narrow leaf plants, e.g. wheat, ryegrass, barley and oats then on broad leaf plants e.g. peas, cotton, ipomoea anr mustard. They are particularly useful in controlling weed growth in cereal crops.

EXAMPLE 22

Using the method of Example 12 the following compounds, as shown in Table I, were prepared and at least one physical constant was determined thereon.

| No. of compound in Table I | Melting point, °C. | Boiling point, °C. at mm. Hg | Refractive index, $n^D$ at °C. | |
|---|---|---|---|---|
| 1 | 52 | | | |
| 2 | 101 | | | |
| 4 | | 85–95  0.1 | 1.5280 | 23 |
| 13 | | | 1.5175 | 23 |
| 20 | | 80–90  0.15 | | |
| 22 | | 140–176  0.05 | | |
| 63 | | 83–85  0.02 | 1.5283 | 26 |
| 76 | | 95–96  0.15 | | |
| 77 | | 116–120  0.2 | | |
| 100 | | | 1.5409 | 24 |
| 102 | | 128–138  0.04 | 1.5193 | 23 |
| 104 | 56–57 | | | |
| 105 | | 86–91  0.1 | | |
| 106 | | 96–97  0.03 | | |
| 107 | | 158–164  0.07 | | |
| 108 | 98–99 | | | |
| 109 | | 156–166  0.25 | | |
| 110 | 78–80 | | | |
| 111 | | 140–170  0.1 | | |
| 113 | | | 1.5140 | 24 |
| 114 | | | 1.5087 | 24 |
| 115 | | | 1.5048 | 24 |
| 117 | | | 1.5360 | 23 |
| 119 | | | 1.5175 | 22 |
| 120 | | | 1.5335 | 23 |
| 122 | 43–45 | | | |
| 123 | 43.5–45 | | | |
| 124 | 54–64 | | | |
| 126 | 44–46 | | | |

In addition further compounds were prepared, but no physical constant was determined. The compounds, as designated by their number in Table I, were 7, 8, 23, 78, 89, 99, 101, 103, 112, 116 and 121.

We claim:

1. A process of controlling the growth of undesired fungi which comprises treating said fungi with a fungicidally effective amount of a composition comprising, as active ingredient, an effective amount of a compound of the formula:

$$\underset{W_n}{\text{(phenyl ring)}}\begin{array}{c}Y\\ \\Z\end{array} - X - A - CO - SR$$

wherein X is selected from the group consisting of oxygen and sulphur, W, Y and Z are separately selected from the group consisting of hydrogen, halogen, nitro, cyano, hydroxy, amino, dimethylamino, acetamido, alkyl of from 1 to 8 carbon atoms, 2-phenyl-prop-2-yl, alkoxy from 1 to 4 carbon atoms, phenoxy, methylthio, and trifluoromethyl; R is selected from the group consisting of alkyl of from 1 to 12 carbon atoms, chloroethyl, allyl, benzyl, cyclohexyl, diethylaminoethyl, hydroxyethyl, phenethyl, 2, 6,6-trimethylbicyclo hept-2-yl, ethoxyethyl, ethoxycarbonylmethyl, aminoethyl, p-t-butyl-o-tolyl, pentachlorophenyl, p-t-butylphenyl, p-chlorophenyl and chloropropyl; A is selected from the group consisting of alkylene of up to 2 carbon atoms, and alkylidene of up to 17 carbon atoms, which may be substituted with a substituent selected from the group consisting of chlorine, methoxy and methylthio; and $n$ is an integer from 1 to 3 inclusive; in admixture with a major amount of an inert carrier.

References Cited

UNITED STATES PATENTS

| | | | |
|---|---|---|---|
| 2,888,480 | 5/1959 | Neher, et al. | 260—455 |
| 3,022,151 | 2/1962 | Searle | 260—455 |
| 3,183,146 | 5/1965 | Van Den Bos, et al. | 424—301 |
| 3,234,082 | 2/1966 | Pianka, et al. | 424—301 |
| 3,320,300 | 5/1967 | Doss | 260—455 |
| 3,346,611 | 10/1967 | Doss | 260—455 |
| 3,372,179 | 3/1968 | Zienty, et al. | 260—455 |

FOREIGN PATENTS

| | | | |
|---|---|---|---|
| 53,461 | 10/1942 | Netherlands | 260—455 |
| 405,815 | 1965 | Japan | 260—455 |
| 1,037,072 | 7/1966 | Great Britain | 424—301 |
| 424,761 | 11/1966 | Switzerland | 260—455 |

ALBERT T. MEYERS, Primary Examiner

F. E. WADDELL, Assistant Examiner

U.S. Cl. X.R.

260—455